United States Patent [19]

Boros

[11] 4,384,456
[45] May 24, 1983

[54] DYNAMIC BREAKWATER AND WAVE ENERGY RECOVERY AND CONVERSION SYSTEM

[76] Inventor: Ladislav J. Boros, 140-22 69th Rd., Flushing, N.Y. 11367

[21] Appl. No.: 216,528

[22] Filed: Dec. 15, 1980

[51] Int. Cl.³ .......................... E02B 3/04; F03B 13/12
[52] U.S. Cl. ....................................... 60/499; 60/506; 60/398; 417/332; 405/28
[58] Field of Search .................. 405/28; 60/497, 499, 60/502, 503, 506, 398; 417/332

[56] References Cited

U.S. PATENT DOCUMENTS

| | | | |
|---|---|---|---|
| 260,016 | 6/1882 | Franklin | 405/28 X |
| 675,039 | 5/1901 | Graff | 60/499 |
| 918,870 | 4/1909 | Lawrence | 60/499 |
| 3,151,564 | 10/1964 | Rosenberg | 60/499 |
| 3,851,476 | 12/1974 | Edwards | 405/28 X |

Primary Examiner—Allen M. Ostrager
Attorney, Agent, or Firm—Steinberg & Raskin

[57] ABSTRACT

A dynamic breakwater system includes at least one and preferably a plurality of dynamic breakwater assemblies, each of which includes a baffle wall member which is pivotally mounted in a body of water about an axis which extends substantially transverse to the direction of wave motion and so that a lower portion thereof is submerged below the water surface while an upper portion thereof extends above the water surface, each baffle wall member being biased such that it has a tendency to move in a direction opposite to the direction of wave motion and wherein apparatus for damping the movement of the baffle wall member when the same moves in the direction of wave motion under the force of waves impinging thereon are provided. Apparatus is provided for recovering at least a portion of the energy imparted to the baffle wall member by the waves impinging thereon and for converting the same to useful energy and generally comprises a fluid circuit supported on a stationary platform assembly and a device operatively interconnecting the baffle wall member and fluid circuit for elevating the pressure of the fluid circulating therein in response to movement of the baffle wall member caused by the waves impinging thereon.

32 Claims, 24 Drawing Figures

DYNAMIC BREAKWATER AND WAVE ENERGY RECOVERY AND CONVERSION SYSTEM

BACKGROUND OF THE INVENTION

This invention relates generally to breakwater systems and, more particularly, to dynamic breakwater systems of the type wherein the hydrostatic and hydrodynamic pressure of the waves impinging on baffle wall members forming a part of the system will move the same. Additionally, the present invention relates to dynamic breakwater systems wherein wave energy can be recovered and converted to useful energy.

Various designs for breakwater systems are, of course, known. Additionally, apparatus are known for recovering wave energy and for converting the same to useful energy. Examples of conventional structure of this type are disclosed in the following U.S. Pat. Nos: 1,024,816; 2,640,326; 3,851,476; 4,039,847; 4,073,147; and 4,123,185.

In general, conventional breakwater systems such as the types disclosed in some of the above-identified patents, are not entirely satisfactory for the reason that, among other things, the members of the breakwater system against which the waves impinge are fixed to the sea bottom so that the forces exerted thereon by the waves are relatively great therefore requiring the members to be relatively massive in size in order to absorb the wave forces. The relatively large forces involved in such conventional systems generally limit the transverse extent thereof so that only a relatively limited area of protection of the harbor or beach with which the breakwater systems is associated can be obtained.

Additionally, in most conventional breakwater systems, the energy of the waves which impinge upon the breakwater members is usually irretrievably lost. In connection with presently known systems whereby wave energy is recovered, such conventional systems are generally inefficient and cannot recover the major portion of the wave energy.

Yet another disadvantage of conventional breakwater systems is that the same are often severely damaged during adverse weather conditions which are generally accompanied by high waves which can damage the breakwater members against which they impinge.

SUMMARY OF THE INVENTION

Accordingly, one object of the present invention is to provide a new and improved breakwater system.

Another object of the present invention is to provide a new and improved dynamic breakwater system, i.e., a breakwater system wherein the members against which the waves impinge are movably mounted, so that the forces arising from the waves impinging on such members are significantly reduced thereby allowing the size of such members to be correspondingly reduced and which, of course, correspondingly reduces the cost of construction of such members.

Still another object of the present invention is to provide a new and improved dynamic breakwater system which can be made longer to provide a greater area of shelter from waves than was possible with conventional breakwater systems.

A further object of the present invention is to provide a new and improved breakwater system which can be erected more quickly and at less cost than conventional breakwater systems.

An additional object of the present invention is to provide a new and improved dynamic breakwater system which is capable of the efficient recovery of wave energy and conversion thereof to useful energy for use or storage.

Yet another object of the present invention is to provide a new and improved dynamic breakwater system wherein the possibility of damage being incurred thereby during adverse weather conditions is significantly reduced.

Briefly, in accordance with the present invention, these and other objects are attained by providing a dynamic breakwater system including at least one and preferably a plurality of dynamic breakwater assemblies each of which includes a baffle wall member which is pivotally mounted in a body of water about an axis which extends substantially transverse to the direction of wave motion so that a lower portion thereof is submerged below the water surface while an upper portion thereof extends above the water surface. The baffle wall member of each breakwater assembly is biased such that the same has a tendency to move in a direction opposite to the direction of wave motion. Apparatus for damping the movement of the baffle wall member when the latter moves in the direction of wave motion under the force of waves impinging thereon are provided. In the illustrated preferred embodiment, the baffle wall member is so biased by providing that the center of gravity thereof is located above and displaced forwardly, i.e., in the direction opposite from the direction of wave travel, of the pivot axis of the baffle wall member.

A stationary apparatus adapted to be fixedly supported on the floor of the body of water in which the breakwater system is located has a platform assembly which is located above the water surface and rearwardly in spaced, adjacent relationship to the baffle wall member of each of the dynamic breakwater assemblies. Apparatus are provided on at least one of the breakwater assemblies and which is operatively associated with the platform assembly for recovering at least a portion of the energy imparted to the baffle wall members by the waves impinging thereon and for converting the same to useful energy. Such wave energy recovery apparatus comprises a fluid circuit which is supported on the platform assembly and apparatus operatively interconnecting the baffle wall member and fluid circuit for elevating the pressure of the fluid circulating therein in response to movement of the baffle wall member caused by the waves impringing thereon. One embodiment of such pressure elevating apparatus comprises a pump device associated with each of the baffle wall members which includes a cylinder mounted on the platform assembly and a piston slidably located within the cylinder to define a sealed chamber therein. A piston rod having one end connected to the piston and the other end coupled to the baffle wall member is provided with the chamber being fluidly intercommunicated with the fluid circuit. A turbine can be placed in the fluid circuit which drives an electric generator so that the wave energy can be converted to electric energy in this manner.

Where the breakwater system comprises a plurality of breakwater assemblies of the type described above, the baffle wall members of the respective breakwater assemblies are substantially identical in configuration, preferably including a substantially planar main portion, a pair of side edge regions which extend at an obtuse angle to the planar main portion and an upper edge region which also extends at an obtuse angle to the planar main portion. Damping apparatus are provided for each respective breakwater assembly and are specifically designed so that even when all of the baffle wall members are moved to their rearward most position, spaces are maintained between adjacent baffle wall members so that the sea water can enter between the spaces to enter a region rearward of the baffle wall members to tend to equalize the forces impressed on the baffle wall members by virtue of the waves impinging thereon.

Further, apparatus are provided for orienting the baffle wall members into a position wherein the same rests on the floor of the body of water and which the breakwater assembly is located during times of severe adverse weather conditions, such as during a tornado or the like. Further, apparatus for locking selected ones of the baffle wall members in a fixed predetermined position are disclosed for maintenance and other reasons. Such systems can be automatically actuated by sensing apparatus located remote from the breakwater system.

Finally, a method for manufacturing and transporting baffle wall members useful in connection with the present invention is disclosed and generally comprises the provision of a form for a baffle wall member in a tank which communicates with the body of water and which the breakwater system is installed whereupon, with the tank being devoid of liquid, concrete is poured onto the form and allowed to cure so that an initial baffle wall member is obtained. Additional baffle wall members are then formed successively over the initial baffle wall member in a sequential manner whereupon the tank is filled with water and communicated with the body of water. Each of the individual baffle wall members can then be floated to the site of the breakwater assembly.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Referring now to the drawings wherein like reference characters designate identical or corresponding parts throughout the several view and more particularly to FIGS. 1-4, thereof a dynamic breakwater system, generally designated 10, according to the present invention comprises at least one and preferably a plurality of breakwater assemblies located in aligned relationship with respect to each other in a direction transverse to the direction of wave motion, designated 14. A typical length for a breakwater system according to the present invention is about onehalf mile while each breakwater assembly may be about thirty feet long as will be described in greater detail below. Of course, it is understood that a breakwater system according to the present invention may be of any length suitable for the particular application for which it is intended.

Figure 1:
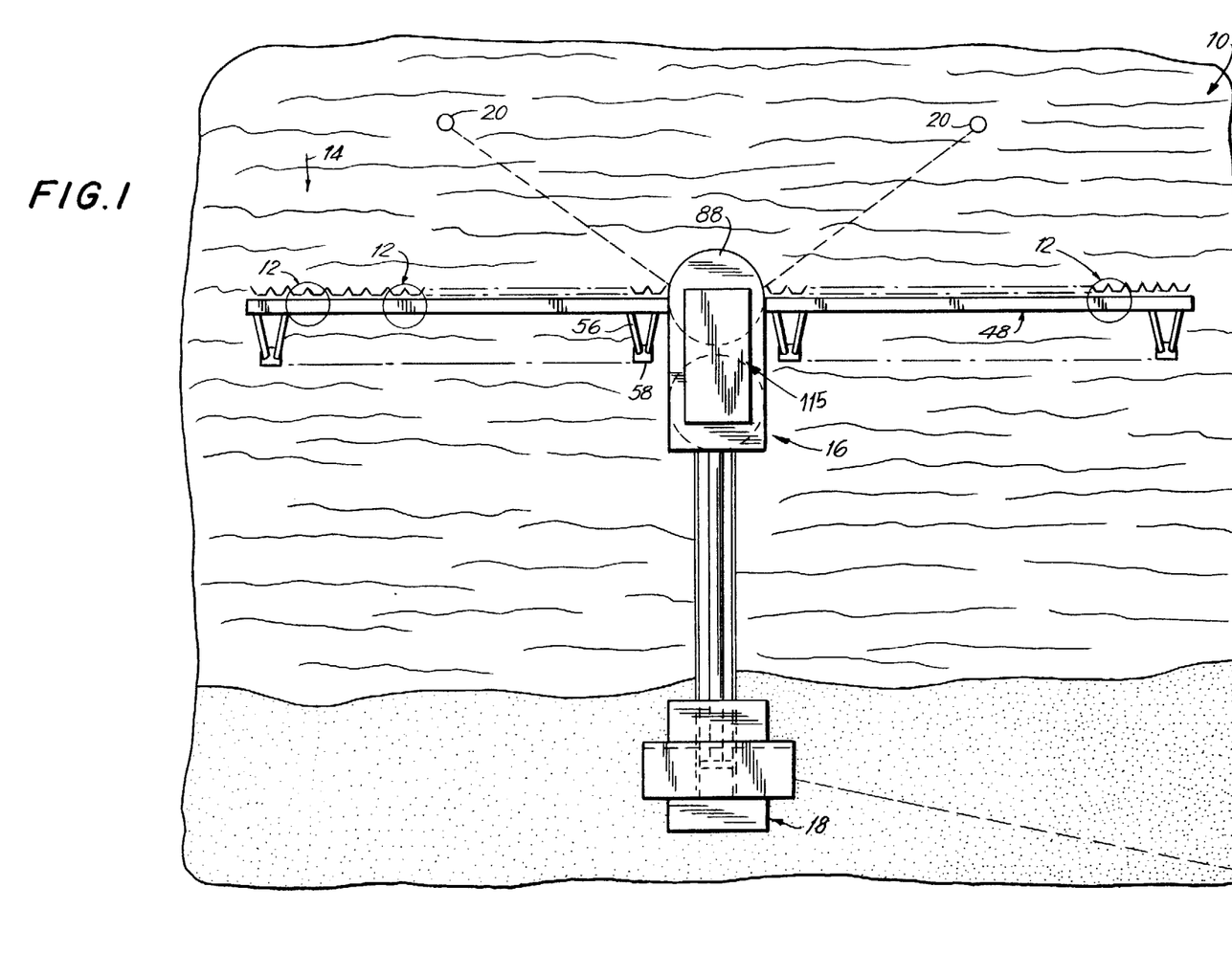
FIG. 1 is a schematic plan view of a dynamic breakwater system constructed in accordance with the present invention.

As seen in FIG. 1, the breakwater system 10 further includes apparatus for recovering at least a portion of the energy imparted to the breakwater assemblies 12 by the waves impinging thereon and converting the same to useful energy, such apparatus being generally designated 16. As will be explained in greater detail below, apparatus 16 extends from the aligned breakwater assemblies 12 to the shore.

Underground water tanks 18 wherein components of the breakwater assemblies 12 can be constructed substantially in situ are also provided, the details of which are also discussed below.

Another feature of the breakwater system 10 is the provision of warning sensor mechanisms 20 which are schematically illustrated in FIG. 1. The warning sensor mechanisms detect unusually high wave conditions and are adapted to transmit a warning signal to the system 10 whereby apparatus is suitably activated to fix selected ones of the breakwater assemblies 12 into suitable positions for accommodating the high wave condition.

Figures 2, 4, 4A:
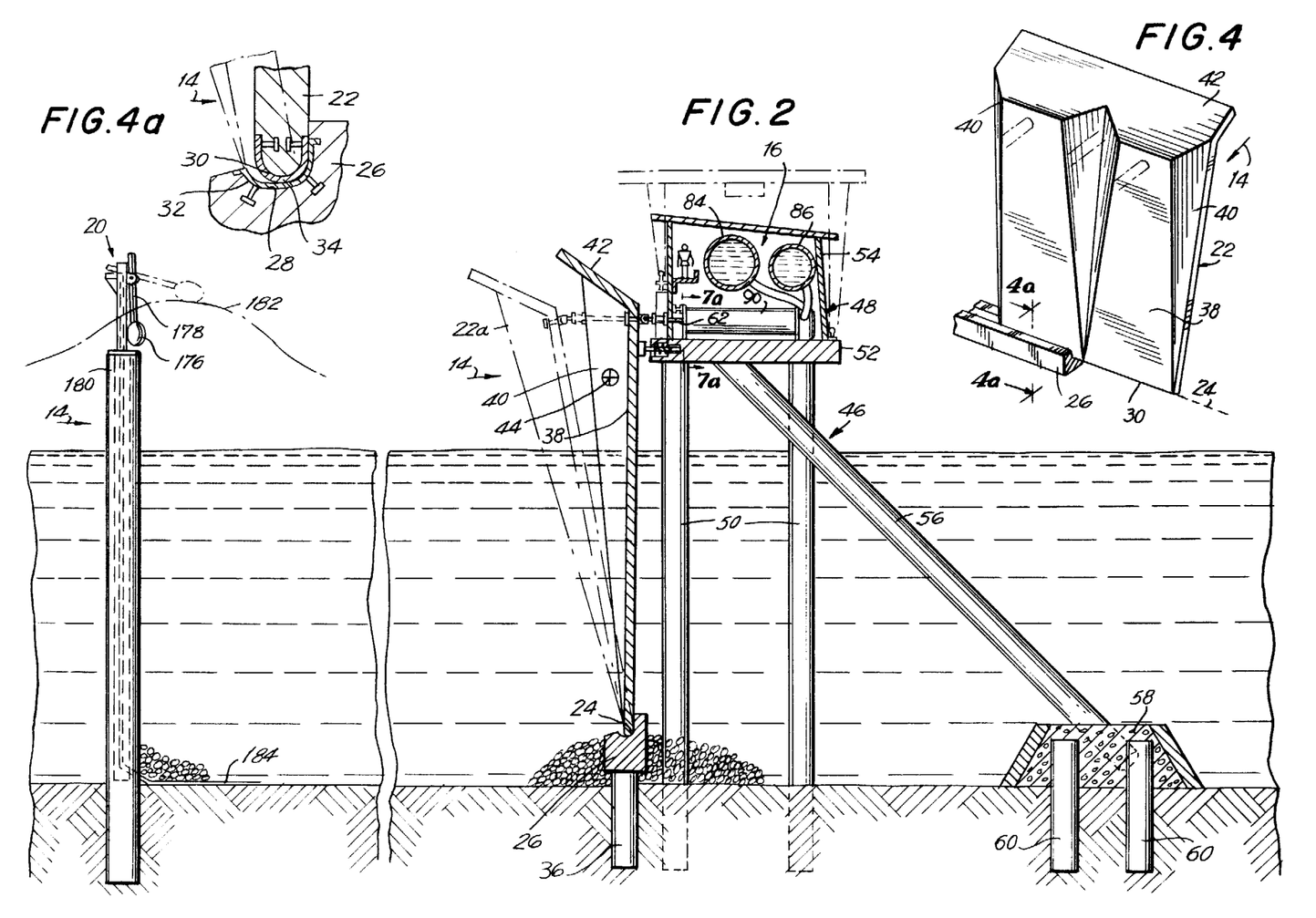
FIG. 2 is a side elevation view in partial section of a dynamic breakwater system according to the present invention.
FIG. 4 is a perspective view of a baffle wall member and associated hinge member for pivotally mounting the baffle wall member in accordance with the present invention.
FIG. 4a is a section view taken along line 4a—4a of FIG. 4.
Figures 3, 5, 6:
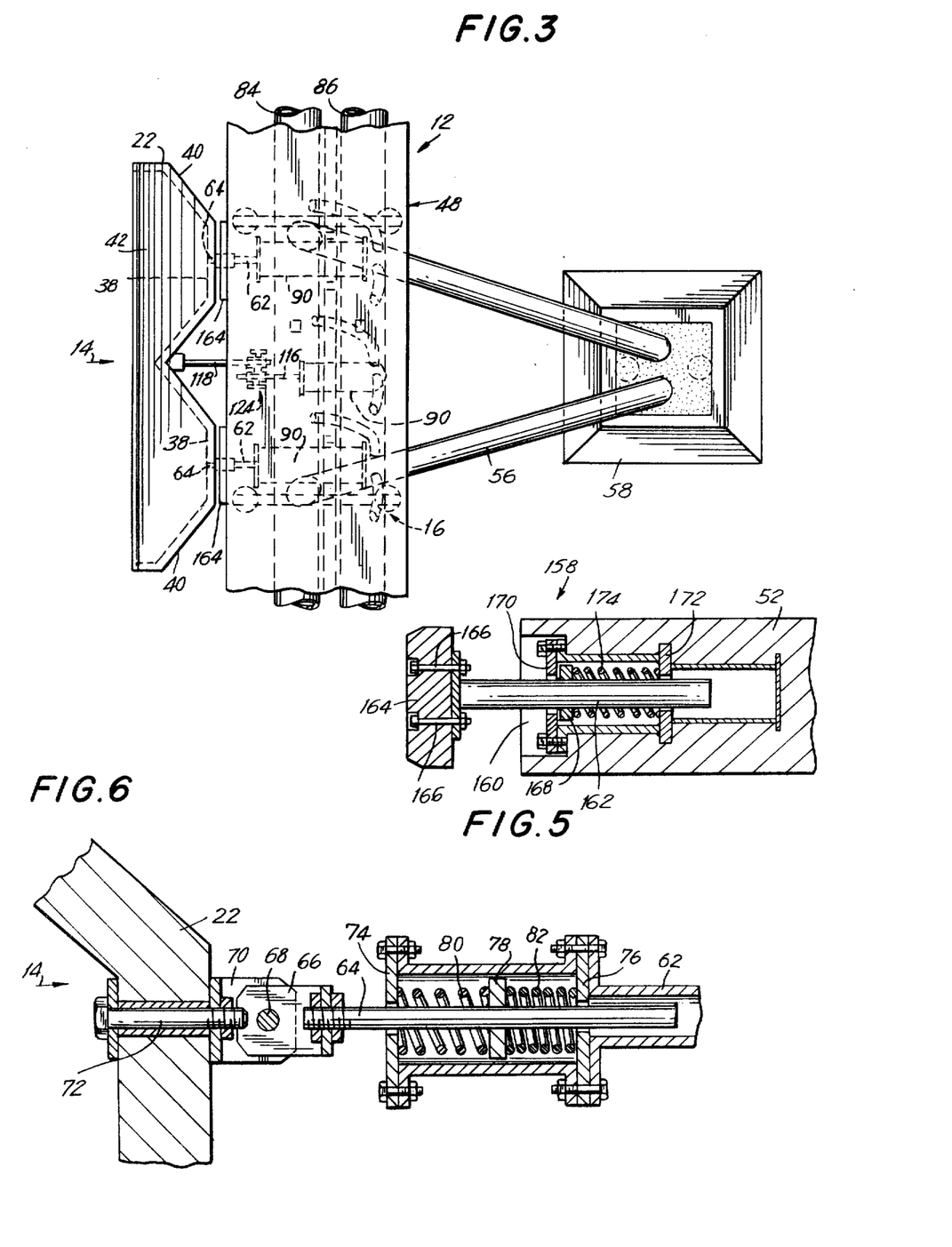
FIG. 3 is a plan view in detail of a dynamic breakwater assembly constructed in accordance with the present invention.
FIG. 5 is a side elevation view in section of damping apparatus for use in connection with the present invention.
FIG. 6 is a side elevation view in section of a portion of a baffle wall member illustrating the means by which the same is connected to apparatus for recovering and converting wave energy.

Referring to FIGS. 2-4, each breakwater assembly 12 includes a baffle wall member 22 which is pivotally mounted in the sea about an axis 24 (FIG. 4) which extends substantially transversely to the direction of wave motion 14, the dimensions of the baffle wall member 22 and the particular location thereof being chosen such that a lower portion of the wall member 22 is submerged while an upper portion thereof extends above the water surface as best seen in FIG. 2. According to the preferred embodiment, a hinge member 26 is located on the sea floor or bed and comprises a concrete member having a concave surface 28 (FIG. 4a) formed therein which extends at least along the length of the bottom edge 30 (FIG. 4) of the baffle wall member 22 and where a plurality of breakwater assemblies 12 are utilized, the hinge member 26 preferably comprises a unitary member which traverses the engire length of the breakwater system 10. As seen in FIG. 4a, the concave surface 28 has a relatively flat bottom portion and a rear portion which extends in a substantially vertical direction. The bottom edge 30 of the baffle wall member 22 has a semicircular cross section which is received in the concave surface 28 of hinge member 26. Metallic liners 32, 34 are fixed to the concave surface 28 and the bottom edge 30 of wall member 22, respectively for wear purposes. This construction provides a free pivoting motion of the baffle wall member 22 about axis 24 which in this case will extend substantially through the lower edge region of the baffle wall member 22. The hinge member 26 is preferably affixed to the sea floor by means of anchors 36.

According to one feature of the present invention, the baffle wall member 22 of each breakwater assembly is biased such that under normal conditions it will tend to move in a direction opposite to the direction of wave motion. Thus, referring to FIG. 2, the baffle wall member 22 of each breakwater assembly is biased in a manner such that the same will tend to move towards the position shown in phantom and designated 22a. In the preferred embodiment, this is accomplished by forming each baffle wall member 22 in a manner such that the center of gravity thereof is located above and forwardly, i.e., in the direction opposite to the direction 14 of wave travel, of the pivot axis 24. More particularly, referring to FIGS. 2-4, the baffle wall member 22 comprises a substantially planar main portion 38, a pair of side edge regions 40 which extend at an obtuse angle to the planer main portion 38 in a direction generally opposite to the direction 14 of wave travel and an upper edge region 42 which also extends at an obtuse angle to the planar main portion 38 in a direction generally opposed to the direction 14 of wave travel. Such construction results in a location for the center of gravity, designated 44 in FIG. 2, which is vertically above and displaced forwardly of the pivot axis 24. By virtue of this fact, the baffle wall member will normally be continually biased to pivot in a counterclockwise direction (as seen in FIG. 2) about axis 24 or, in other words, in a direction opposite to the direction 14 of wave motion. The baffle wall members 22 can pivot only to a predetermined maximum position by virtue of its association with the apparatus 16 for recovering and converting wave energy as will be more fully explained below.

Position rearwardly of the baffle wall members 22 and comprising a part of each of the breakwater assemblies 12 are stationary apparatus, generally designated 46, including a platform assembly 48 which is located above the water surface in normally spaced, adjacent relationship to the baffle wall members of the breakwater assemblies. In the case where a plurality of breakwater assemblies 12 are provided as illustrated in FIG. 1, the platform assembly 48 preferably comprises a continuous assembly which extends generally parallel to the aligned pluralities of baffle wall members. The platform assembly 48 is fixed to the sea bed by means of columns 50 whose lower ends are embedded in the sea floor. The platform assembly 48 generally comprises a concrete platform member 52 and an enclosure 54 and supports the apparatus 16 for recovering and converting the wave energy incident on the baffle wall members as will be explained below. A stabilizing column 56 has its upper end fixed to the bottom surface of the platform member 52 and its lower end embedded in a concrete base 58 which is itself affixed to the sea bottom by means of anchors 60.

Apparatus is provided for damping the movement of the baffle wall member 22 of each breakwater assembly 12 when the wall member moves in the direction 14 of wave motion under the force of the waves which impinge thereon. Referring to FIGS. 2 and 6, a hollow damping piston rod 62 mounted on the platform assembly 48 and an elongate rod 64 one end of which is pivotally mounted to the baffle wall member 22 and the other end of which extends into the damping piston rod 62. More particularly, the forward end of the elongate rod 64 is threadedly connected to a bracket 66 which is pivotally connected by pin 68 to another bracket 70 which itself is fixed to the rear surface of baffle wall member 22 by a conventional threaded fastener 72. As seen in FIG. 6, the forward portion of damping piston rod 62 has spaced forward and rearward walls 74, 76 extending through its hollow interior, the walls having central, aligned openings through which the elongate rod 64 passes. An annular disc 78 is affixed to the elongate rod 64. A pair of compression springs 80, 82 are located within the interior of piston rod 62, the spring 80 having its ends bearing against the forward wall 74 and disc 78 while the spring 82 has its ends bearing against disc 78 and the rearward wall 76. The dimensions of the piston rod 62 and characteristics of the springs 80, 82 are chosen such that when the baffle wall member 22 is in a normal position, i.e., when waves are not impinging thereon, the baffle wall member will be in its normal position slightly compressing spring 80. When the baffle wall member 22 begins to move rearwardly, i.e., in the direction 14 of wave motion, under the force of waves impinging thereon, the spring 82 will be compressed thereby exerting a return force on the alongate member 64 tending to dampen the rearward movement of the baffle wall member. Similarly, forward motion of the baffle wall member will be dampened by spring 80.

It is seen from the above that a dynamic breakwater system is provided including at least one breakwater assembly, each such assembly including a baffle wall member which is pivotally mounted so that the same undergoes a pivotal movement when the same is subjected to the action of waves impinging thereon. By virtue of the location of the center of gravity of each baffle wall member above and forwardly of the pivot axis thereof, the baffle wall members will tend to pivot in a direction opposite to the direction of wave motion so as to assume a position most suitable for absorbing the maximum amount of energy imprated by the waves which impringe thereon. The particular construction of the baffle wall members further facilitates an efficient absorption of the wave energy by the baffle wall members. When the baffle wall members are impinged by waves so as to pivot in the direction of wave motion, such movement will be damped by the apparatus described above.

By providing such a dynamic breakwater system, i.e., a breakwater system wherein the baffle wall members themselves move under the forces of wave motion, it will be understood that the forces exerted on the baffle wall members by the waves are significantly reduced relative to conventional breakwater systems wherein baffle walls are stationary during operation. This in turn allows a significant reduction in the size and bulk of the baffle wall members which thereby reduces the overall cost of construction.

The particular construction and operation of the dynamic breakwater system of the present invention renders the same particularly amenable to an incorporation within the system of apparatus for efficiently recovering wave energy, i.e., energy imparted to the breakwater system resulting in the pivotal movement of the baffle wall members as described above and for converting the recovered energy into useful energy. In this connection, referring to FIGS. 1–3, 7 and 8, apparatus 16 are provided for recovering energy imparted to the baffle wall members by the waves impinging thereon and converting the same to useful energy. In the preferred embodiment, apparatus 16 comprises a fluid circuit supported on the platform assembly 48 which includes a low pressure pipe 84, a high pressure pipe 86 and a pressurizer tank 88 (FIG. 1). A fluid circulates through the fluid circuit which may comprise any suitable liquid or gas. The liquid preferably comprises one selected from the group consisting of water, a hydrocarbon oil, a hydraulic break fluid and a silicone oil. Where gas is utilized, it is preferred that the same be selected from the group consisting of air, nitrogen and carbon dioxide. It is understood, however, that other fluids may be utilized than those specifically mentioned.

Figure 7:
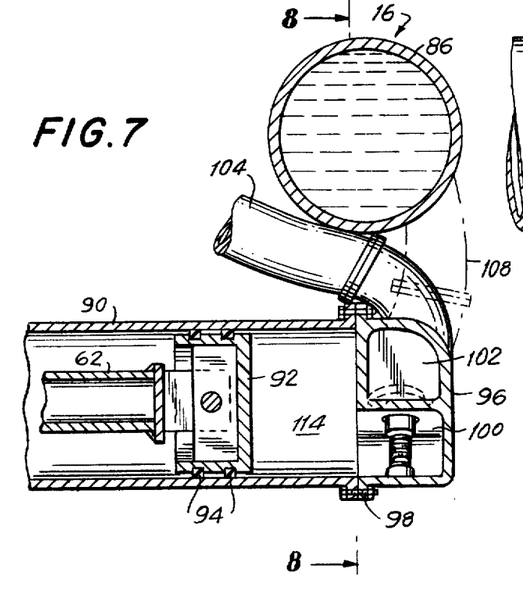
FIG. 7 is a side elevation view in partial section of apparatus according to the present invention for recovery and converting wave energy.

Referring to FIG. 3, each baffle wall member 22 is preferably provided with a pair of damping assemblies as described above. Thus, a pair of elongate rods 64 have their ends pivotally secured to the baffle wall member 22 and are associated with corresponding damping piston rods 62 mounted on the platform assembly 48. The damping piston rods 62 extend into respective pump cylinders 90 which are mounted on the platform member 52 as best seen in FIG. 2. Thus, it is understood that each baffle wall member 22 in the preferred embodiment has a pair of pump cylinders 90 associated therewith in which the ends of damping pistons rods 62 are movably located. A piston 92 is pivotally connected to the end of piston rod 62 as seen in FIG. 7 and is provided with sealing rings 94 which sealingly engage the inner surface of piston cylinder 90 to define a sealed chamber 114 in cylinder 90. In this manner, as the baffle wall member 22 pivots rearwardly under the action of wave motion and then forwardly under the biasing forces created by the particular location of the center of gravity thereof, the piston 92 will reciprocate towards the right as seen in FIG. 7 and then return towards the left.

Figure 8:
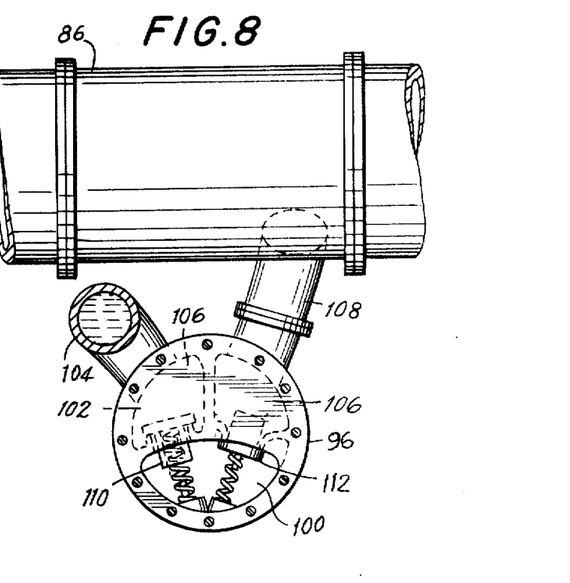
FIG. 8 is a section view taken along line 8—8 of FIG. 7.

Referring to FIGS. 7 and 8, a three chamber valve member 96 is fixed to the open end of piston cylinder 90 at mating flanges 98. Thus, a first chamber 100 communicates with the sealed chamber defined by piston cylinder 90 and piston 92. A second chamber 102 is fluidly coupled to the low pressure pipe 84 through a branch pipe 104 while the third chamber 106 is fluidly coupled to the high pressure pipe 86 through a branch pipe 108. A one-way valve 110 is provided between first and second chambers 100, 102, the valve 110 allowing fluid to flow from the second chamber 102 into the first chamber 100 but preventing flow in an opposite direction. Similarly, a one-way valve 112 is provided between the first and third chambers 100, 106 which, however, allows fluid to flow only from the first chamber 100 into the third chamber 106 while preventing flow in the opposite direction. Each one-way valve comprises a valve member biased in an appropriate direction through the provision of a spring as is conventional.

The energy conversion apparatus described above functions as follows. As the baffle wall member 22 moves in a forward direction under the biasing force created by the particular location of the center of gravity, the piston 92 will move towards the left as seen in FIG. 7 thereby creating a low pressure within piston cylinder 90. The low pressure acts to open the one-way valve 110 allowing fluid to enter into the first chamber 100 from the second chamber 102 which communicates with the low pressure pipe 84. In this manner, the chamber 114 in piston cylinder 90 becomes filled with fluid. When the baffle wall member 22 moves rearwardly under the forces of waves impinging thereon, the piston 92 will move towards the right as seen in FIG. 7 thereby forcing the fluid contained in chamber 114 through first chamber 100 and into the third chamber 106 past the one-way valve 112 and into the high pressure pipe 86 through branch pipe 108. In this manner, a relatively continuous flow of fluid through the fluid circuit will be obtained with intermittent high pressure fluid being added thereto through the operation of the apparatus described above. Referring to FIG. 1, a turbine building 115 is provided in association with the breakwater system which includes appropriate turbines and electric generators therein. The fluid circuit directs the pressurized fluid through a turbine which then powers an electric generator which converts the energy so recovered into useful electric energy.

It is seen from the above that the dynamic breakwater system is particularly amenable to the provision of apparatus for efficiently converting the wave energy to useful energy in a clean, non-polluting manner without the generation of any harmful byproducts. In the embodiment described above, movement of the baffle wall member in the direction opposite to the direction 14 of wave motion causes the pump chamber 114 to expand thereby drawing fluid from the low pressure pipe 84 through the branch pipe 104 and one-way valve 110 into the pump chamber 114 whereupon movement of the baffle wall member in the direction 14 of wave motion under the force of waves impinging thereon causes the pump chamber 114 to be compressed thereby elevating the pressure of fluid contained therein and forcing the same through the one-way valve 112, the branch pipe 108 and into the high pressure pipe 86.

Figure 9:
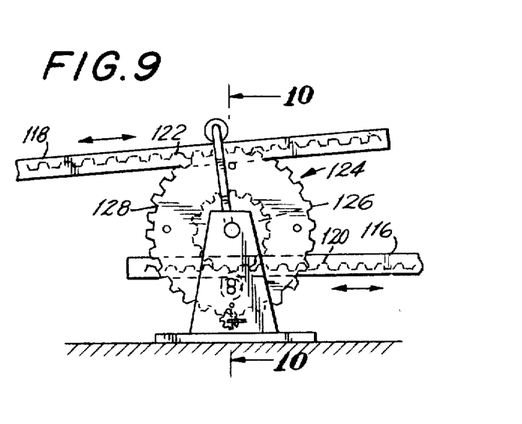
FIG. 9 is a side view of direction reversing apparatus for use in connection with the energy recovery and conversion apparatus of the present invention.
Figure 10:
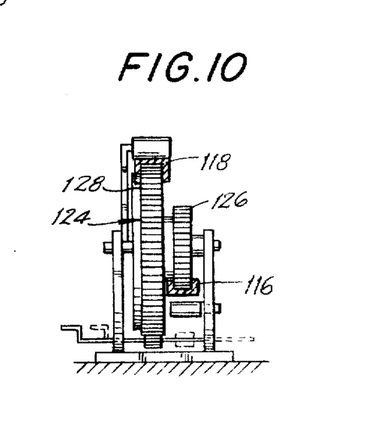
FIG. 10 is a section view taken along line 10—10 of FIG. 9.

It is also desirable to provide means for recovering energy imparted to the baffle wall members by secondary wave motion, i.e., that wave motion which occurs in a direction opposite to the direction 14 of primary wave motion and which results from the sea water after having reached its innermost point towards the shore tending to move seawardly. Referring to FIGS. 3, 9 and 10, this is accomplished by providing for each baffle wall assembly a pump cylinder 90′ essentially identical to the pump cylinders 90 wherein the piston 92 thereof is interconnected to the baffle wall member by means of a piston rod 116 having one end affixed to the piston, a second rod 118 affixed to the baffle wall member and apparatus connecting the free ends of these rods for reversing the direction of movement thereof. Thus, the piston rod 116 is provided with gear teeth 120 while the second rod 118 is similarly provided with gear teeth 122. Rotary gear apparatus 124 are mounted on platform assembly 48 including a reduced diameter gear 126 and an enlarged diameter gear 128 coaxially mounted so that gear teeth 120 and piston rod 116 mesh with the gear 126 while the gear teeth 122 of the second rod 118 mesh with the enlarged diameter gear 128. In this manner, when the baffle wall member 22 moves in the direction 14 of wave motion under the force of waves impinging thereon, the piston chamber 114 will expand thereby drawing fluid into it and upon movement of the baffle wall member in the direction opposite to the direction 14 of wave motion, the piston chamber is compressed thereby elevating the pressure of fluid contained therein and forcing the same into the high pressure pipe 86. In this manner, movement of the baffle wall member in the direction opposite to the direction 14 of wave motion under the force of secondary wave motion will contribute toward the elevation of pressure of the fluid in the fluid circuit thereby recovering energy imparted from the secondary wave motion.

Figures 16, 18, 20, 21:
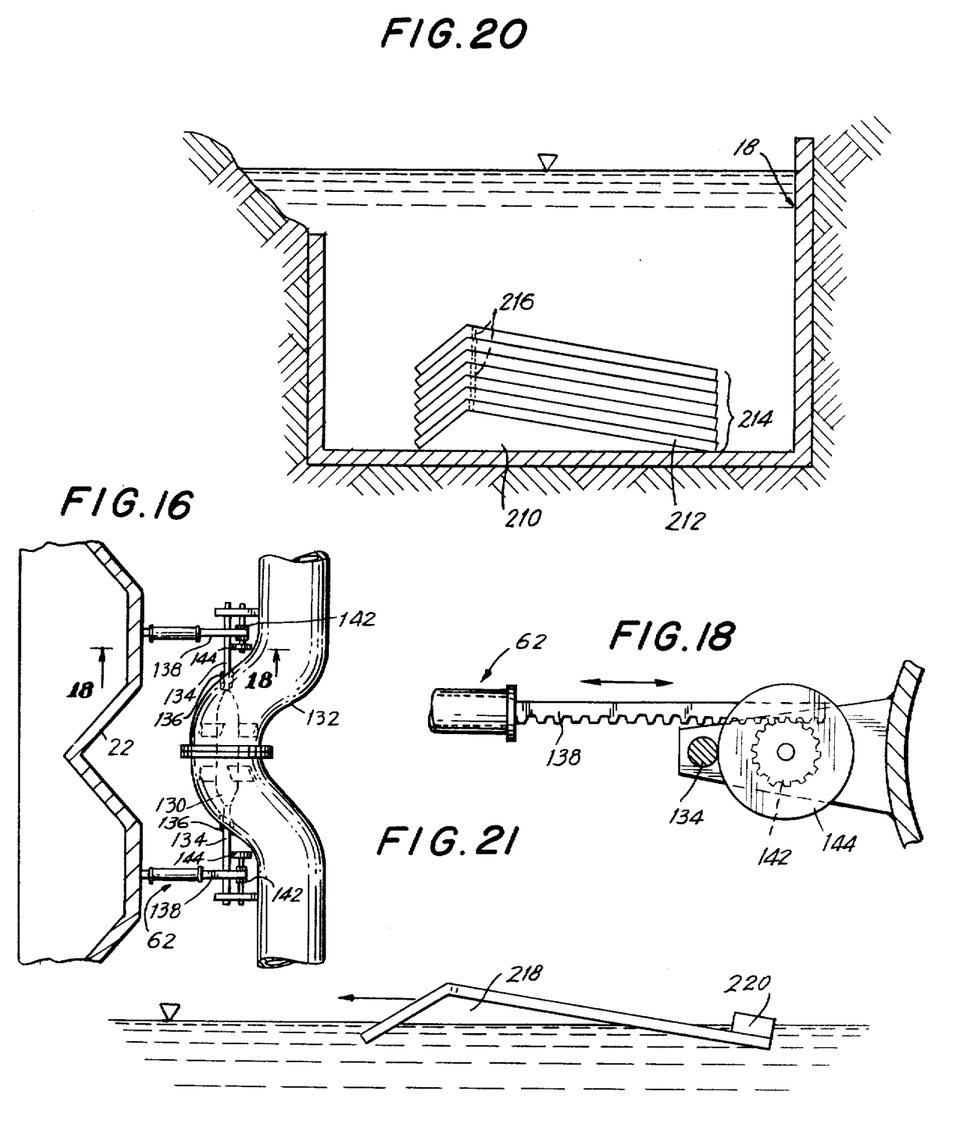
FIG. 16 is a plan view partially broken away of a breakwater assembly according to the present invention illustrating an alternative embodiment for the wave energy recovery and converting apparatus.
FIG. 18 illustrates the interconnection of the baffle wall member to the energy recovery and conversion apparatus in the embodiment illustrated in FIG. 16.
FIG. 20 is a side view in section illustrating a method for manufacturing and transporting baffle wall members according to the present invention.
FIG. 21 is a view illustrating another step in the method of manufacturing and transporting the baffle wall members according to the present invention.

According to another embodiment of the present invention, wave energy is recovered utilizing impeller structure in lieu of the pump structure described above. Thus, referring to FIGS. 16–18, a fluid circuit is provided in a manner similar to the fluid circuit described above. Each breakwater assembly will include an impeller element 130 rotatably mounted in a curved section 132 of the fluid circuit pipe. Referring to FIG. 16, a pair of shaft portions 134 extend from respective ends of the impeller element 130 and pass outwardly from the curved section 132 of the fluid pipe through fluid seals 136 which permit rotation of the respective shafts 134 and, therefore, the impeller element 130. Apparatus are provided whereby movement of the baffle wall member in response to waves impinging thereon will rotate the impeller element. In the illustrated embodiment, a pair of elongate members 138 having gear teeth 140 each have one of their ends pivotally affixed to the baffle wall member 22 through a damping piston rod 62, the gear teeth 140 engaging a gear 142 mounted in the platform assembly 48. The gear 142 is rotatably coupled to the shaft portions 134 through a coaxial gear 144 (FIG. 18). It is thus seen that movement of the baffle wall member in the direction of wave motion results in rotation of the impeller element 130 in a corresponding direction while movement of the baffle wall member in a direction opposite to the direction of wave motion will result in rotation of the impeller element 130 in an opposite direction.

Figure 17:
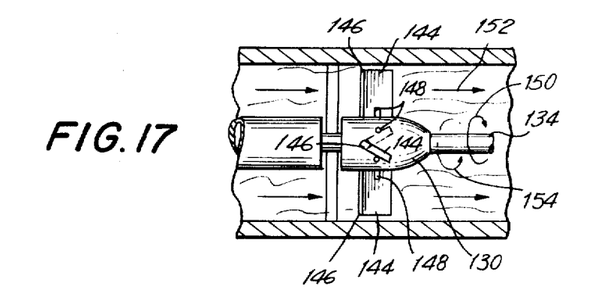
FIG. 17 is a detailed view of the impeller element utilized in connection with the apparatus illustrated in FIG. 16.

By the particular construction of the impeller element 130, rotation thereof in either direction will induce a fluid flow in the fluid circuit in the same direction. More particularly, referring to FIG. 17, the impeller element 130 has a plurality of radially extending vanes 144, each vane being pivotally mounted about a radial axis 146 which is substantially coextensive with a radially extending edge region thereof. As seen in FIG. 17, the radial axis 146 of each vane 144 is located at mutually corresponding edge regions of the vanes. Further, means for limiting the extent of pivoting of each of the vanes 144 are provided. Thus, a pair of pins 148 are fixed on the impeller on either side of each vane 144. In operation, referring to FIG. 17, rotation of the impeller in the direction of arrow 150 in response, for example, or movement of the baffle wall member in a direction opposite to wave motion, bauses the vanes 144 to pivot to one extreme position illustrated in the solid lines in FIG. 17 to thereby cause a fluid flow in the direction of arrow 152. Upon movement of the baffle wall member in a direction of wave motion, the impeller will then reverse its direction of rotation to the direction of arrow 154. However, the vanes 144 will then automatically pivot to the dotted line configuration so that rotation of the impeller member will continue to induce flow in the fluid circuit in the direction of arrows 152. In this manner, it is seen that the pressure of the fluid in the fluid circuit will be elevated and a flow caused in the same direction regardless of the direction of rotation of the impeller element by virtue of the vanes 144 pivoting about their respective axes to a position which corresponds to the direction of rotation of the shafts 134. In this manner, energy from both the primary as well as the secondary wave motion will be recovered by the breakwater system of the present invention. It should also be noted that when the baffle wall member is stationary the vanes 144 will turn to a neutral or axial extending position so that the impeller will not impede fluid flow in the pipe and no energy losses will occur due to the presence of the impeller.

Figure 11A:
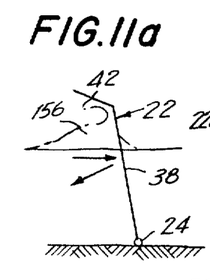
FIGS. 11a and 11b are schematic side and plan views illustrating the wave action against a baffle wall member constructed in accordance with the present invention.
Figure 11B:
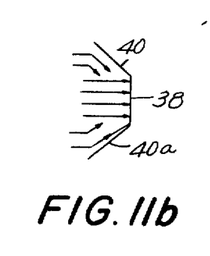
Figure 12:
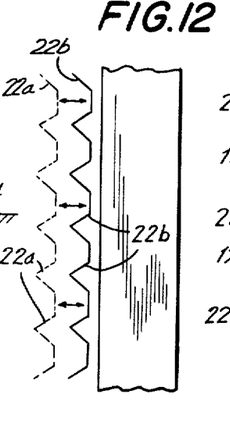
FIG. 12 is a schematic plan view of the dynamic breakwater system of the present invention illustrating normal operation thereof.

Referring to FIGS. 11a, b and 12, the operation of the breakwater system of the present invention under normal conditions is illustrated. FIG. 11 schematically illustrates a wave 156 impinging on a baffle wall member 22 and FIG. 12 illustrates the movement of the baffle wall members under normal conditions of operation. Thus, when a wave impinges on a baffle wall member, the latter is in a forward position, designated 22a in FIG. 12, having moved thereto under the action of the displaced center of gravity as described above. As seen in FIG. 11b, the wave is directed to the planar main portion 38 of the baffle wall member by the obliquely extending side edge region 40 and central region 40a thereof. A portion of the wave then follows the planar main portion 38 upwardly onto the obliquely extending upper edge region 42 (FIG. 11a) whereupon a complete reversal of direction of the water is undergone. A portion of the wave is deflected downwardly by the planar main portion 38. In this manner, the baffle wall member 22 receives the maximum force of wave 156 which results in a movement of the baffle wall member to its rearward position, designated 22b in FIG. 12. The individual baffle wall members then return to their forward positions 22a under the action of the displaced center of gravity and, additionally, under the action of any secondary wave motions from the rear. The large forces of the waves are in this manner effectively dissipated by virtue of the dynamic nature of the breakwater system while allowing the baffle wall members to be relatively light elements which are easy to manufacture as compared to conventional breakwater systems. As noted above, the dynamic breakwater system of the present invention is particularly amenable to the incorporation of apparatus for recovering the energy dissipated by the waves and converting the same to useful energy.

Figure 13:
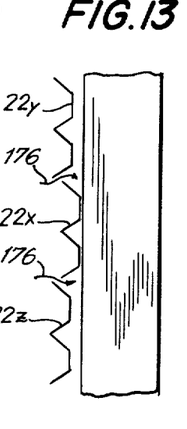
FIG. 13 is a view similar to FIG. 12 illustrating an overload position of the breakwater system.

Referring to FIG. 13, an overload condition can occur either when very strong waves hit the baffle wall members or when waves imping at relatively high frequency so that sufficient time is not available to permit them to return to their forward positions. This would be dangerous if all the baffle wall members are in their rearwardmost position simultaneously thereby not allowing any dynamic resistance to be presented to the oncoming waves in that great forces would be incident on one structure. According to the inventor, bumper assemblies 158, described below, are provided which locate the baffle wall members in staggered relation when in their rearwardmost position so as to insure that water can enter between spaces thereby created between adjacent baffle wall members creating a release valve type of action.

Thus, referring to FIGS. 2, 3, 5 and 13, each breakwater assembly includes one or more bumper assemblies and in the illustrated embodiment, a pair of identical bumper assemblies 158. Each bumper assembly 158 is mounted in an opening 160 formed in the forward edge region of platform member 52. A bumper assembly 158 includes an elongate rod 162 (FIG. 5) having a bumper member 164 fastened to one end thereof by conventional means, such as by threaded fasteners 166. An annular ring 168 is fixed to the rod 162, the latter passing through a pair of aligned openings defined by a pair of annular rings 170, 172. A compression spring 174 has its ends located against ring 168 and ring 172, respectively, as seen in FIG. 5 so that spring 174 normally urges the rod 162 and bumper member 164 fixed thereto forwardly, i.e., in a direction opposite to the direction of wave motion. Thus, as seen in FIGS. 2 and 3, when the baffle wall member 22 is in its rearward position, the planar main portions 38 thereof abut against the bumper member 164 and, depending upon the force of the wave acting on the baffle wall member, the rod 162 will be pushed rearwardly within opening 160. In this manner, the baffle wall member is prevented from contacting the platform assembly 48 eliminating the possibility of damage thereto.

In order to assure that the edges of the side edge regions of adjacent baffle members are not contiguous with each other, i.e., to provide a staggered relatively to allow the passage of water into the region rearwardly of the baffle wall members, the spring constant of the springs 174 of the bumper assemblies of every other breakwater assembly is different from the spring constant of the springs of the bumper assemblies of adjacent breakwater assemblies. In this manner, under the weather conditions described above wherein the time interval between waves is relatively short so that the baffle wall members are maintained in a rearward position against their respective bumper assemblies, as seen in FIG. 13 adjacent baffle wall members 22 will be slightly displaced from each other thereby allowing water to pass through the space defined between adjacent baffle wall members. Thus, as seen in FIG. 13 the bumper assemblies associated with one baffle wall member 22x may have a lower spring constant than the bumper assemblies of adjacent baffle wall members 22y, 22z. By this provision, the rearward position of baffle wall members 22x will be somewhat behind the corresponding rearward positions of baffle wall members 22y, 22z. The edges of the side edge regions of the baffle wall assemblies will be correspondingly displaced with respect to each other thereby providing a space between them through which water, designated 176, can pass. The space so created functions as a release valve so that water which passes through the space to a location rearwardly of the baffle wall assemblies tends to reduce the overpressure.

According to another feature of the invention, when an occasional very high wave is about to hit the baffle wall members, selected ones of the baffle wall members, e.g., alternate ones of the baffle wall members, connected to the automatic actuation of appropriate apparatus by means of remote sensing apparatus.

Figure 15:
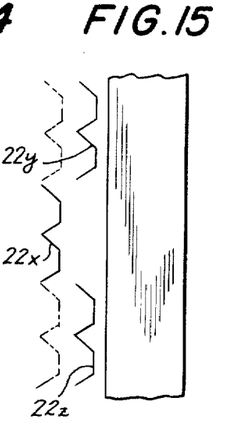
FIG. 15 is a view similar to FIG. 12 illustrating the breakwater system under adverse weather conditions.

Referring to FIG. 15, in such conditions, the baffle wall member 22x is automatically locked in its forward position while the adjacent baffle wall members 22y, 22z, continue to operate in their normal manner. Such a provision will prevent the breakwater system from becoming seriously damaged by the adverse conditions, yet permit the same to continue to function as a breakwater and, furthermore, to convert a portion of the valve energy to useful energy while cleaning a large portion of the excess thereof.

Figure 7A:
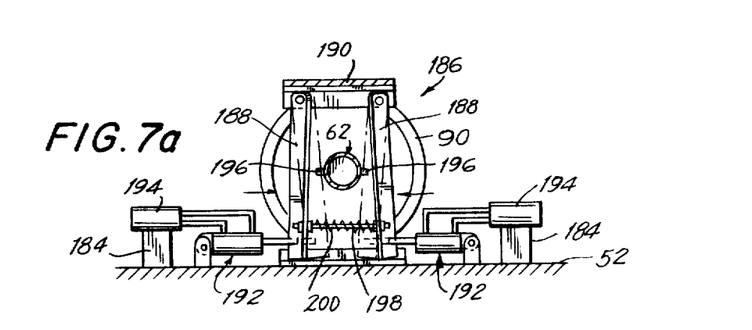
FIG. 7a is a section view taken along line 7a—7a of FIG. 2.

Referring to FIGS. 1, 2 and 7a, one or more warning sensing mechanisms 20 are provided which sense abnormally high wave conditions and, upon such sensing, send a signal to apparatus described below associated with the breakwater system for locking selected ones of the baffle wall members in their forward position. In the illustrated preferred embodiment, the warning sensor mechanism 20 comprises a float 176 mounted to the end of a rod 178 which itself is pivotally mounted to the upper end of a column assembly 180 whose lower end is embedded within the sea floor. The float 176 is mounted at a height substantially above the normal sea level. When high wave conditions which normally accompany the severe adverse weather conditions are present, however, such as a wave designated 182 in FIG. 2, the float and associated rod 178 will be pivoted thereby closing a switch (not shown) which activates a signal sending circuit through cables 184 laid on the sea bottom which are interconnected with appropriate apparatus on the platform assembly 48 for locking selective ones of the baffle wall members 22 in their forward position.

Referring to FIG. 7a, apparatus 186 are associated with selected ones of the breakwater assemblies, e.g., every alternate one of the breakwater assemblies, for locking the baffle wall member associated therewith in its forward position. In the illustrated embodiment, apparatus 186 comprises a pair of elongated locking members 188 which are pivotally mounted at their upper end to frame components 190 of platform assembly 48. A pair of piston-cylinder arrangements 192 are each pivotally mounted on the platform member 52 having one end of the pistons associated therewith fixed to the lower free end of a respective one of the locking members 188, each piston-cylinder arrangement 192 being connected with an actuating mechanism 194 to which cables 184 are coupled. The locking members 188 are mounted such that actuation of the piston-cylinder arrangements 192 will cause the locking members 188 to pivot inwardly to the dotted line positions whereupon they are located rearwardly of locking projections 196 provided on the elongate members 62 which can move outwardly but cannot return. A spring 198 mounted on a rod 200 which extends between the locking members 188 normally maintains the latter in their open or unlocked configuration.

Upon a signal being received from the sensor mechanism 20 indicating a high wave condition, the cylinders 192, which preferably comprise pneumatic actuated cylinders, automatically move the locking members 188 to their locking position behind the projections 196 on rod 62 thereby locking the rod 62 in its extended position. In this manner, the selected ones of the baffle wall members provided with the locking apparatus 186 are locked in their forward position automatically upon the sensor mechanisms 20 sensing a high wave condition.

Figure 14:
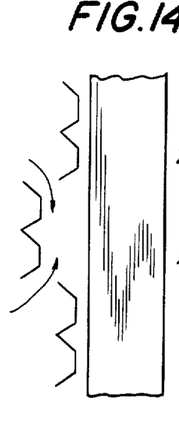
FIG. 14 is a view similar to FIG. 12 illustrating a maintenance position of the breakwater system.
Figure 19:
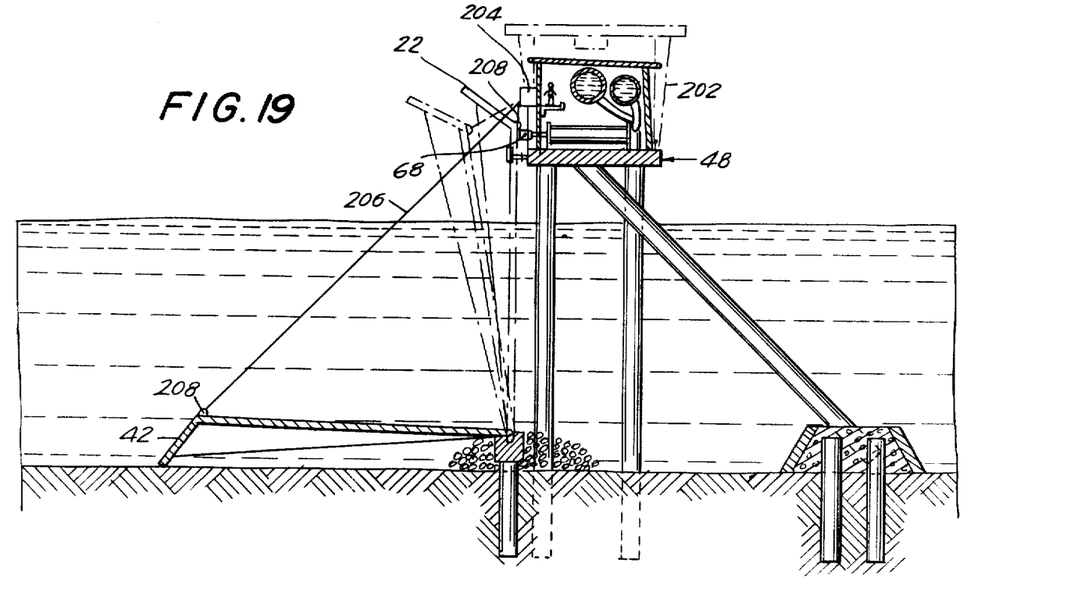
FIG. 19 is a side elevation view in partial section of the breakwater system of the present invention illustrating winch apparatus for lowering the baffle wall members to a submerged position.

For maintenance purposes, all of the baffle wall members may be locked into selective forward and rearward positions. Thus, referring to FIG. 14, the baffle wall members may be locked in positions as shown, i.e., wherein alternate baffle wall members are locked in a forward position while intermediate baffle members are located in their retracted or rearward positions as shown. The water will pass through the spaces between the baffle wall members and be directed against itself to dissipate the energy. Thus, the apparatus will continue to act as a breakwater. Apparatus similar to that described above (see FIG. 7a) can be utilized in this connection. The particular manner in which the baffle wall members are pivotally mounted as described above in connection with FIG. 4 facilitates another manner in which the breakwater system of the present invention can be prepared for severe adverse weather conditions. More particularly, referring to FIG. 19, according to another feature of the present invention, apparatus for orienting the position of one or more of the baffle wall members so that the same are totally emerged within the water to rest on the sea floor are illustrated. A travelling winch assembly, designated 202 is provided on the platform assembly 48 so as to be movable under the control of an operator over the entire extent of the breakwater system and so as to selectively positionable rearwardly of any selected baffle wall member 22. The winch mechanism 204 travels with the winch assembly and is provided with a cable 206, one end of which is connectable to a fastening device 208 fixed on the baffle wall member 22. When severe adverse weather conditions, such as a tornado or the like are expected, the winch assembly 202 is driven into location rearwardly of a baffle wall member 22 whereupon the free end of the cable 206 is affixed to the fastening device 208 thereof. The pin 68 (FIG. 6) is then removed so as to disconnect the elongate member 64 from the baffle wall member 22 whereupon the baffle wall member 22 is allowed to pivot downwardly to the position shown in FIG. 19 wherein the upper edge of the upper edge region 42 of the baffle wall member engages the sea bottom as shown. The cable is then unfastened from the fastening device 208 by allowing the cable to become slack, whereupon the cable is then rewound and the winch mechanism moved to the next succeeding baffle wall member. In this manner, all of the baffle wall members may be relocated to the position illustrated in FIG. 19 so that the same will not be effected by the adverse weather conditions.

As noted above, the breakwater system of the present invention also is advantageous in that it permits the baffle wall members to be constructed substantially on the site of the breakwater system. Referring to FIGS. 1, 20 and 21, one or more underground sweet water tanks 18 are formed at the shore as seen in FIG. 20. A form 210 is located on the bottom of the tank 18 having a configuration by which the baffle wall members can be manufactured. With the tank 18 empty, concrete is poured over the form and allowed to cure to form an initial baffle wall member 212. After curing, successive baffle wall members 214 are similarly formed, one over the other, each successive baffle wall member being allowed to cure prior to concrete being poured thereover to form the subsequent baffle wall members. An opening 216 is preferably formed in each of the baffle wall members at corresponding locations so as to align with each other as seen in FIG. 20. After the baffle wall members are constructed, the tank 18 is filled with water as is a channel (not shown) which communicates the tank 18 with the sea. Compressed air is then introduced into the openings 216, which can act as bolt holes for the connection of the elongate members 64, whereupon the uppermost baffle wall member is floated to the surface, an air bubble 218 (FIG. 21) being formed between the baffle wall member and the surface of the sea. An optional float 220 may be provided at the end of the baffle wall member. Each baffle wall member is then floated to the site of the breakwater assembly and incorporated therein. Subsequent baffle wall members are floated to the site of the breakwater system in a similar manner.

Obviously numerous modifications and variations of the present invention are possible in the light of the above teachings. It is therefore to be understood that within the scope of the claims appended hereto, the invention may be practiced otherwise than as specifically disclosed herein.

What is claimed is:

1. A dynamic breakwater system comprising at least one dynamic breakwater assembly, each said assembly comprising: a baffle wall member; means for pivotally mounting said baffle wall member in a body of water about an axis which extends substantially transverse to the direction of wave motion and so that a lower portion thereof is submerged below the water surface and an upper portion thereof extends above the water surface; means for biasing said baffle wall member such that said baffle wall member has a tendency to move in a direction opposite to the direction of wave motion; and means for damping the movement of said baffle wall member when the latter moves in the direction of wave motion under the force of waves impinging thereon.

2. The combination of claim 1 wherein said mounting means comprises a hinge member adapted to be located on the floor of said body of water and wherein said baffle wall member has a lower edge region which is operatively associated with said hinge member so that said lower edge region substantially contains said pivot axis.

3. The combination of claim 1 wherein said biasing means comprise portions formed integrally on and comprising a part of said baffle wall member such that the center of gravity thereof is located above and displaced forwardly, i.e., in the direction opposite to the direction of wave travel, of said pivot axis, whereby by virtue of the location of the center of gravity thereof, said baffle wall member tends to move in a direction opposite to the direction of wave motion.

4. The combination of claim 1 further including stationary apparatus adapted to be fixedly supported on the floor of said body of water, said stationary apparatus having a platform assembly located above the water surface in normally spaced, adjacent relationship to said baffle wall member of each of said dynamic breakwater assemblies.

5. The combination of claim 4 wherein said dumping means comprises a damping cylinder mounted on said platform assembly, an elongate member having one end affixed to said baffle wall member and its other end slidably located in said damping cylinder, and means provided in said damping cylinder for exerting a force on said elongate member in the direction opposite to the direction of wave motion when said elongate member moves in the direction of wave motion.

6. The combination of claim 5 wherein said force exerting means exerts a force on said elongate member in the direction opposite to the direction in which said elongate member moves.

7. The combination of claim 4 further including at least one bumper assembly mounted on said platform assembly, said bumper assembly including a bumper member located in the path of movement of said baffle wall member when the latter moves in the direction of wave motion under the force of waves impinging thereon.

8. The combination of claim 7 wherein said bumper assembly further comprises at least support rod to one end of which said bumper member is attached and spring means associated with said rod for biasing said rod and bumper member attached thereto in a direction opposite to the direction of wave motion.

9. The combination of claim 4 further including means provided on at least one of said breakwater assemblies and operatively associated with said platform assembly for recovering at least a portion of the energy imparted to said baffle wall member by the waves impinging thereon and converting the same to useful energy.

10. The combination of claim 9 wherein said wave energy recovery and conversion means comprises a fluid circuit supported on said platform assembly and means operatively interconnecting said baffle wall member and fluid circuit for elevating the pressure of the fluid circulating therein in response to movement of said baffle wall member caused by the waves impinging thereon.

11. The combination of claim 10 wherein said pressure elevating means comprises pump apparatus associated with each of said baffle wall members, said pump apparatus including a cylinder mounted on said platform assembly and a piston slidably located within said cylinder defining a sealed chamber therein, piston rod means having one end connected to said piston and the other end coupled to said baffle wall member, and means for fluidly interconnecting said sealed chamber in said fluid circuit.

12. The combination of claim 11 wherein said means for fluidly interconnecting said sealed chamber and fluid circuit comprises a first fluid conduit interconnecting said chamber with a low pressure section of said fluid circuit and first one-way valve means for preventing fluid flow towards said fluid circuit located therein, a second fluid conduit interconnecting said chamber with a high pressure section of said fluid circuit and second one-way valve means for preventing fluid flow towards said chamber located therein.

13. The combination of claim 12 wherein in at least one of said pump apparatus, said piston rod means directly interconnects said piston and baffle wall member so that movement of the latter is in a direction opposite to the direction of wave motion by said biasing means and other secondary forces, if any, causes the chamber to expand thereby drawing fluid from said fluid circuit low pressure section through said first fluid conduit and first one-way valve means into said chamber and so that movement of the baffle wall member in the direction of wave motion under the force of waves impinging thereon causes the chamber to be compressed thereby elevating the pressure of fluid contained therein and forcing the same through said second fluid conduit and second one-way valve means into the fluid circuit high pressure section.

14. The combination of claim 12 wherein in at least one of said pump apparatus, said piston rod means comprises a piston rod having one end affixed to said piston, and second rod having one end affixed to said baffle wall member, and means interconnecting the other ends of said rods for reversing the direction of movement therein, so that movement of the baffle wall member in the direction of wave motion under the force of waves impinging thereon causes the chamber to expand thereby drawing fluid from said fluid circuit low pressure section through said first fluid conduit and first one-way valve means into said chamber and so that movement of the baffle wall member in the direction opposite to the direction of wave motion by said biasing means and other secondary forces causes the chamber to be compressed thereby elevating the pressure of fluid contained therein and forcing the same through said second fluid conduit in second one-way valve means into the fluid circuit high pressure section.

15. The combination of claim 14 wherein said movement reversing means comprises rotary gear apparatus, said other ends of said rods having gear teeth in meshing engagement with said gear apparatus.

16. The combination of claim 10 wherein said pressure elevating means comprises an impeller element rotatably mounted in said fluid circuit, and means operatively associated with said baffle wall means and impeller element for rotating the latter in response to movement of said baffle wall member in response to the waves impinging thereon to thereby elevate the pressure of the fluid in said circuit.

17. The combination of claim 16 wherein said impeller element comprises a rotatably mounted shaft having a plurality of vanes radially extending therefrom each of said vanes being pivotally mounted about a radial axis which is substantially coextensive with a radially extending edge region thereof, and means for limiting the pivotal movement of each of said vanes about its respective axis, whereby the pressure of the fluid in said fluid circuit will be elevated regardless of the direction of rotation of said impeller element by virtue of said vanes pivoting about their respective axes to a position corresponding to the direction of rotation of said shaft.

18. The combination of claim 10 wherein said wave energy recovery and conversion means further comprises a turbine located in said fluid circuit.

19. The combination of claim 18 wherein said wave energy recovery and conversion means further comprises an electric generator to which said turbine is connected.

20. The combination of claim 19 wherein said fluid in said fluid circuit is a liquid selected from the group consisting of water, a hydrocarbon oil, a hydraulic break fluid, and a silicone oil.

21. The combination of claim 19 wherein the fluid in said fluid circuit is a gas selected from the group consisting of air, nitrogen and carbon dioxide.

22. The combination of claim 4 wherein said breakwater system comprises a plurality of said breakwater assemblies.

23. The combination of claim 22 wherein said baffle wall members of said breakwater assemblies are substantially identical and wherein said pivot axes of said baffle wall members are substantially coincident.

24. The combination of claim 22 wherein each baffle wall member of a respective breakwater assembly includes a substantially planar main portion, a pair of side edge regions extending at an obtuse angle to said planar main portion and an upper edge region extending at an obtuse angle to said planar main portion, said side and upper edge regions extending in the direction opposite to the direction of wave motion.

25. The combination of claim 24 wherein each of said baffle wall members further includes a central vertically extending water-directing portion.

26. The combination of claim 22 further including for each of said breakwater assemblies at least one bumper assembly mounted on said platform assembly, said bumper assembly including a bumper member located in the path of movement of said baffle wall member when the latter moves in the direction of wave motion under the force of waves impinging thereon.

27. The combination of claim 26 wherein each of said bumper assemblies further comprises at least one support rod to one end of which said bumper member is attached and spring means associated with said rod for biasing said rod and bumper member attached thereto in a direction opposite to the direction of wave motion, and wherein the spring constant of said spring means for each bumper assembly of one breakwater assembly is different from the spring constant of said spring means for the bumper assemblies of the breakwater assemblies adjacent thereto.

28. The combination of claim 22 further including means for orienting the position of one or more of said baffle wall members whereby the latter is totally emerged and rests on the floor of the body of water with the free edge of said upper edge region engaging the floor.

29. The combinaton of claim 28 wherein said baffle wall member orientation means comprise winch apparatus movably located on said platform assembly in a manner such that the same can be operatively associated with any of the baffle wall members of said plurality of breakwater assemblies.

30. The combination of claim 22 further including means for locking selective ones of said baffle wall members in a fixed predetermined position.

31. The combination of claim 30 further including means for sensing high wave conditions located remote from said breakwater system and means interconnecting said sensing means at breakwater system for providing a signal at said breakwater system when high wave conditions are sensed by said sensing means.

32. The combination of claim 31 further including means for automatically locking selective ones of said baffle wall members in a fixed predetermined position, said automatic locking means being actuated by said signal.

* * * * *